United States Patent Office 2,798,056
Patented July 2, 1957

2,798,056

COATING COMPOSITIONS CONTAINING CHLORINATED RUBBER AND METHOD OF FORMING SAME

Victor J. Larson, Wilmington, Del., assignor to Hercules Powder Company, Wilmington, Del., a corporation of Delaware No Drawing. Application June 17, 1953,
Serial No. 362,385

4 Claims. (Cl. 260—3.3)

This invention relates to novel protective coating compositions and to a method for preparing same. In a specific aspect, this invention relates to novel coating compositions containing dispersed particles comprising chlorinated rubber and to a method for preparing said composition.

Polymeric materials such as chlorinated rubber, ethyl cellulose, nitrocellulose, acrylic styrene copolymers, and the like, are useful in coating compositions for application to various surfaces, such as wood, metal, rubber, and the like, by spraying, brushing, dipping, etc. On evaporation of the volatile ingredients from the composition, the nonvolatile components form a coating having excellent adherence to the surface, a good appearance, flexibility, stability, and, in some instances, resistance to corrosion. Conventional protective coating systems containing polymeric materials, and, in particular, chlorinated rubber, require the use of hydrocarbon solvents having a Kauri-Butanol value of at least 70–75. This Kauri-Butanol value (K-B) is determined in accordance with the test described by Gardner in "Paints, Varnishes, Lacquers and Colors," 7th edition, October 1935, at page 808. These conventional systems are handicapped by the fact that the aromatic hydrocarbons normally employed as a solvent have an unpleasant odor and by the additional fact that the solvents tend to cause "lifting" of previously painted surfaces. These conventional systems also cause a certain amount of "brush drag" as well as "cobwebbing" when sprayed onto a suitable surface. Furthermore, when these conventional systems are employed in spray guns or on brushes, considerable difficulty is experienced in cleaning the compositions from the equipment with ordinary solvents.

The above handicaps are overcome by employing a dispersion technique wherein the polymeric material is not in solution such as in the conventional systems described above. In the dispersion technique the chlorinated rubber or other polymeric material is present in the system or coating composition in finely divided particles. The viscosity of such dispersion system is relatively low and consequently higher solids coatings can be prepared which present no difficulty during application by brushing or spraying operations.

In accordance with this invention a protective coating composition containing dispersed particles of a polymeric material, such as chlorinated rubber, is prepared by forming a high solids solution or mixture of chlorinated rubber, a modified alkyd resin, and an aromatic hydrocarbon solvent. A diluent, such as an aliphatic hydrocarbon, is then added to the solution until particles containing chlorinated rubber precipitate in a finely divided form. The resulting mixture can then be diluted with additional aliphatic hydrocarbon diluent without affecting the stability or film-forming properties of the composition. The dispersion system prepared in accordance with this invention is a special type of organosol. Films cast from this system become clear on air drying because the dispersed particles containing chlorinated rubber go into solution during the final stages of drying at room temperature. No special fusing techniques or heat treatments are required to obtain film integrity. This is in marked contrast to the normal types of vinyl chloride copolymer organosols which require heat exposure to form continuous films. Generally organosols are prepared by adding a dispersant and a diluent to a finely divided polymeric material and then grinding the mixture to reduce the particle size of agglomerates of polymeric material and to wet the discrete particles with dispersant. This invention is unique in that it is not necessary to use a finely divided polymeric material to produce a dispersion since the fine particle size of the dispersed phase is accomplished by precipitation involving the addition of a diluent to a solution of the polymer and dispersant.

The following examples illustrate the preparation of dispersions in accordance with this invention. In these examples the compositions are shown in parts by weight. Also, in each of these examples, a chlorinated rubber containing about 67% chlorine and having a viscosity of 10 cps. in a 20% by weight solution in toluene at 25° C. is employed. The indicated boiling points of the solvents and diluents are the temperatures at which 50% of the solvent or diluent was distilled off.

Example 1

A chlorinated rubber stand oil containing 50% nonvolatiles was prepared with the following ingredients:

| | Parts by weight |
|---|---|
| Chlorinated rubber | 26 |
| Linseed oil | 39 |
| Mineral spirits (K-B 37) | 35 |
| Aromatic hydrocarbon solvent (Solvesso 100, B. P. 328° F.) | 30 |

One hundred fifty-eight parts by weight of a 15-gallon Pentalyn B56-nonbreak soybean oil varnish (50% nonvolatiles in mineral spirits) was slowly added to the above stand oil with agitation. Pentalyn B56 is a maleic anhydride-modified pentaerythritol ester of rosin containing free hydroxyl groups and having an acid number of 120. At 50% nonvolatiles the stand oil-varnish solution was clear. Seventy-two parts of mineral spirits was then slowly added to the blend and the final Kauri-Butanol value (K-B) of the solvent phase for this dispersion was 44. During the addition of the mineral spirits fine particles containing chlorinated rubber precipitated without settling out of the blend. The average size of the dispersed particles was 0.1 micron, and it was possible to thin the dispersion infinitely with aliphatic hydrocarbon without causing settling of the dispersed particles.

Example 2

One hundred fifty parts of a 15-gallon nonbreak soybean oil-Pentalyn B56 varnish (50% nonvolatiles in mineral spirits having a K-B of 37) was slowly added to 50 parts of a chlorinated rubber solution (50% in xylene). The resulting solution was clear. The solids content of this blend was reduced to 40% by addition of mineral spirits and the final K-B of the solvent blend in this dispersion was 44. During the addition of the mineral spirits fine particles containing chlorinated rubber precipitated, and on standing overnight no settling out of the dispersed particles was observed. Clear films were cast from this dispersion and the dispersion could be diluted infinitely with aliphatic hydrocarbons without affecting the stability or film-forming properties of the dispersion.

Example 3

A solution was prepared with 50 parts of chlorinated rubber (50% in Solvesso 100, an aromatic hydrocarbon solvent having a boiling point of 328° F.) and 150 parts of a 15-gallon linseed oil-Pentalyn X varnish (50% in mineral spirits). Pentalyn X is a maleic anhydride-modified pentaerythritol ester of rosin having an acid number of 15 to 18. The blend was cold-mixed by adding the varnish slowly to the chlorinated rubber solution, and the resulting solution was clear. The solids content of the solution was reduced to 40% by addition of mineral spirits (K-B 37). During this dilution with mineral spirits, fine particles containing chlorinated rubber precipitated. The final K-B of the solvent blend in this dispersion was 44. Films which became clear on drying at room temperature were cast from this dispersion.

*Example 4*

A solution was formed with 50 parts of chlorinated rubber (50% solids in Solvesso 100, an aromatic hydrocarbon solvent having a boiling point of 328° F.) and 150 parts of a 10-gallon nonbreak soybean oil-Pentalyn B56 varnish (50% in mineral spirits). The solution was cold-mixed by slowly adding the varnish to the chlorinated rubber solution. Fifty parts of mineral spirits (K-B 37) was then added to the solution. The K-B of the solvent blend was 44, and during dilution with the mineral spirits fine particles containing chlorinated rubber precipitated. Clear films were cast with this dispersion.

*Example 5*

A solution was prepared by cold-mixing 50 parts of chlorinated rubber (50% solids in Solvesso 100, an aromatic hydrocarbon solvent having a boiling point of 328° F.) and 150 parts of a 40-gallon nonbreak soybean oil-Pentalyn B56 varnish (50% in mineral spirits). The resulting solution was diluted with 50 parts of mineral spirits (K-B 37) to form a stable dispersion of finely divided particles containing chlorinated rubber. The solvent blend used in this dispersion had a final K-B of 44. Clear films were cast from this dispersion.

*Example 6*

Twenty-one hundred parts of Pentalyn B56 and 2,320 parts of nonbreak soybean oil were mixed and heated at a temperature of 575°–585° F. As the heating continued, the viscosity of the resulting varnish increased. During the heating period, varnish samples A, B and C were withdrawn and dissolved in mineral spirits having a boiling point of 343° F. and a K-B value of 37–38. The resulting solutions were then admixed with a solution of chlorinated rubber in aromatic hydrocarbon solvent as in Example 3. The viscosities of the varnish samples, as determined by the Gardner-Holdt method described by Gardner in "Paints, Varnishes, Lacquers and Colors," 7th edition, October 1935, are shown in the following table:

| Varnish Sample | Percent Solids in Mineral Spirits | Viscosity, stokes |
| --- | --- | --- |
| A | 50 | B—0.65 |
| B | 50 | H—2.00 |
| C | 50 | M—3.20 |

Varnish sample A did not form a dispersion when employed as in Example 3. Varnishes B and C formed stable dispersions which produced clear films. Thus, the viscosity of a 50% solids varnish or dispersant, as determined in a solvent having a K-B value of 37–38, should be above 0.65 stoke. Preferably, the viscosity of a 50% solids varnish should be within the range of 2.00 to 3.20 stokes.

*Example 7*

Eighty parts of chlorinated rubber (50% in Solvesso 100, an aromatic hydrocarbon solvent having a boiling point of 328° F.), 10 parts of chlorinated biphenyl and 100 parts of a 15-gallon nonbreak soybean oil-Pentalyn B56 varnish (50% in mineral spirits) were blended to form a clear solution and the solution was then thinned to 40% solids with mineral spirits (K-B 37). A stable dispersion of finely divided particles containing chlorinated rubber was formed during the thinning. The K-B of the solvent blend was 47 and the dispersion formed clear films.

*Example 8*

Fifty parts of chlorinated rubber (50% in Solvesso 100, an aromatic hydrocarbon solvent), 75 parts of a 15-gallon nonbreak soybean oil-Pentalyn B56 varnish (50% in mineral spirits) and 75 parts of a long oil oxidizing-type alkyd resin based on the phthalic-glyceride radical having a solids acid number of 4 to 8 (50% in mineral spirits) were blended to form a clear solution, and the resulting solution was then thinned with 50 parts of mineral spirits. The K-B of the solvent blend was 44. During the thinning, a stable dispersion of finely divided particles containing chlorinated rubber was formed which yielded a clear film upon drying.

The preferred method for forming the dispersions of this invention is demonstrated by the above examples. In this method the dispersant or varnish is slowly blended into a chlorinated rubber solution in an aromatic hydrocarbon solvent. The varnish is added in small increments with adequate agitation and a smooth gel-free solution is attained before each varnish addition is made. When all the dispersant or varnish has been added, the aliphatic hydrocarbon diluent (low K-B solvent) is added to precipitate the finely divided particles containing chlorinated rubber. A more practical method for preparing the dispersions of this invention on a plant scale involves a blending or mixing operation in a pebble mill. The chlorinated rubber dissolved in a highly aromatic hydrocarbon solvent and the varnish are added to a pebble mill and ground until a smooth gel-free vehicle is obtained. The mill is then opened and sufficient aliphatic hydrocarbon diluent is added to effect precipitation of finely divided particles containing chlorinated rubber. If desired, pigments can be added simultaneously with the aliphatic hydrocarbon addition and grinding is then continued.

The chlorinated rubber that is employed in practicing this invention can be prepared by any of the usual procedures. For example, natural or synthetic rubber is dissolved in carbon tetrachloride, and chlorine gas is passed through the solution to chlorinate the rubber, the resulting chlorinated product containing from 62% to 70% chlorine, preferably about 67% chlorine. In the above examples, the chlorinated rubber employed had a viscosity of 10 cps. as measured in a 20% by weight solution in toluene at 25° C. However, the viscosity of the chlorinated rubber can range from about 5 cps. up to as much as 125 cps. When the higher viscosity types of chlorinated rubber are employed, it is usually necessary to increase the amount of aromatic hydrocarbon solvent employed. If a chlorinated rubber having a viscosity of 20 cps. is used, a 40–45% solids solution of chlorinated rubber in aromatic hydrocarbon is used instead of the 50% solids solution normally used with a 10-centipoise chlorinated rubber. With a chlorinated rubber having a viscosity of 125 cps., it is usually necessary to reduce the solids concentration of the solution to about 30% to 35%. Best results are obtained with a 10-centipoise chlorinated rubber. Occasionally, a slight haze has been observed in the film when a 20- or 125-centipoise material is used. This haze can usually be eliminated by increasing the aromatic hydrocarbon solvent content or by the addition of small percentages of a good plasticizer, such as dioctyl sebacate, and the like.

In the above examples the chlorinated rubber constituted about 25% of the total solids content of the dispersion. However, the amount of chlorinated rubber employed in the dispersion is not limited to the 25% total solids, but it can be increased to as much as 40% and higher, for example, by reducing the total amount of varnish blended into the chlorinated rubber solution. Actually, the chlorinated rubber can make up from about 1% to about as much as 50% of the total solids in the dispersion. As the percentage of chlorinated rubber is increased to about 35%, it is desirable to include a plasticizer to prevent brittleness of the film, and at concentrations about 40% a plasticizer is essential in order to produce a clear film. Any of the plasticizers normally used with chlorinated rubber may be used in the dispersion system. Among these plasticizers are diamyl phthalate, dibutyl phthalate, dibutyl sebacate, dioctyl phthalate, dioctyl sebacate, chlorinated biphenyl, tributyl phosphate, triphenyl phosphate, chlorinated paraffin, and the like. The plasticizer can be added to the finished dispersion or to the chlorinated rubber solution prior to blending with the varnish.

The dispersant or varnish that is employed in making these dispersions contains a resin prepared from maleic anhydride, rosin, and a polyhydric alcohol such as glycerin or pentaerythritol. A suitable method for preparing the resin is described by Rheineck in U. S. Patent No. 2,536,090. The varnish or dispersant is prepared by heating a mixture of the resin and a drying oil such as soybean oil, linseed oil, dehydrated castor oil, perilla oil, poppy seed oil, tung oil, tall oil, bodied oils, and the like, at a temperature of about 585° F. The amount of drying oil employed to produce the varnish determines the oil length of the varnish, and in general medium to long oil length varnishes can be used. The blend of resin and oil is heated for a period of time sufficient to produce a varnish having a viscosity suitable for use in this invention. After the blend has been heated for an adequate period of time, an aliphatic hydrocarbon solvent, such as mineral spirits, is added to obtain a varnish having about a 50% solids content. It is important that the final viscosity of the varnish be such that the varnish is suitable for use in these dispersions. In general, this viscosity, as measured at 50% solids in a solvent such as mineral spirits having a K–B value of 37–38, is greater than 0.65 stoke, and the maximum viscosity that can be used is that viscosity immediately above which gel formation occurs in a 50% solids solution. For practical purposes, the viscosity in a 50% solids solution should not exceed 3.7 stokes. The viscosity limits vary with the oil length of the varnish which usually is within the range of 10 to 40 gallons of oil per 100 pounds of resin. For example, the preferred minimum viscosity for a 10-gallon oil length varnish is about 2.75 stokes at 50% solids, measured as indicated above, and for a 40-gallon oil length varnish the preferred minimum viscosity at 50% solids is about 1.40 strokes. When using a 15-gallon oil length varnish, it is preferable that the viscosity in a 50% solids solution be within the range of 2.00 to 3.20 strokes. As indicated above, the amount of chlorinated rubber that is employed may constitute from about 1% to 50% of the total solids in the dispersion. The amount of varnish that is used can be such that the varnish constitutes from about 50% to 99% of the total solids in the dispersion. The total percentage of solids in the dispersion is limited by the stirring means available for producing the dispersion. Practically, the maximum amount of total solids in the dispersion is about 40%. The minimum amount of solids is determined by the point of poor stability of the dispersion. Actually, the dispersion can be diluted in some instances to the point where the total solids is not greater than about 1%, and a clear film can be produced with the resulting dispersion. Preferably, the total solids content is not less than about 5%, and the most preferred range is from 25% to 40% total solids.

Aromatic hydrocarbon solvents that can be used in preparing these dispersions are normally liquid and include benzene, toluene, zylene, Solvesso 100, mixtures of these aromatic hydrocarbons, and the like. Aliphatic hydrocarbon solvents that can be used are also normally liquid and include gasoline, heptane, hexane, mineral spirits, turpentine, VM & P naphtha, and mixtures of the above solvents. The proportions of aromatic and aliphatic hydrocarbon solvents are ordinarily such that the aromatic hydrocarbon solvents comprise from about 15 to about 45 weight percent of the total solvent content of the dispersion. Preferably, it is desirable to employ aliphatic hydrocarbon solvents that boil lower than the aromatic solvents. This selection of boiling points is usually necessary because when the dispersion is applied to a surface to be coated, it is desirable to have the aliphatic hydrocarbon solvent evaporate more rapidly than the aromatic hydrocarbon solvent. At some period during the evaporation of the solvent from the film in the drying cycle, enough aromatic solvent must be present to redissolve the dispersed particles and to permit a free flow of the resulting clear film. Dispersions can be prepared in accordance with this invention by employing aliphatic hydrocarbon solvents that boil at the same temperature as, or at higher temperatures than, the aromatic solvents. However, difficulty is sometimes encountered in casting clear films from such dispersions.

Solvents having a K–B value of 75 or higher are usually regarded as good solvents for chlorinated rubber. The varnish employed in these dispersions has a solubilizing effect upon the chlorinated rubber, and in the preparation of these dispersions the fine particles containing chlorinated rubber begin to settle out when the K–B value of the solvent system is somewhat lower than 75. When preparing dispersions wherein the total solids contain 25% chlorinated rubber and 75% varnish, as in some of the above examples, the particles begin to precipitate when the K–B value of the solvent system is about 50, and, if the amount of varnish employed is reduced, the K–B value at which precipitation occurs increases. For the preferred dispersions of this invention, the aromatic and aliphatic hydrocarbon solvents are selected and proportioned so that, when the dispersion is applied to a surface to be coated, the solvents evaporate during the drying cycle at such a rate that the K–B value of the solvent system increases to a value above the K–B value at which the fine particles containing chlorinated rubber are precipitated while the film is still free flowing. Thus, during the drying cycle, the dispersed particles are redissolved in the unevaporated solvent, and a clear film results upon further solvent evaporation.

The finely divided particles dispersed in accordance with this invention contain predominantly chlorinated rubber. However, the particles are not composed entirely of chlorinated rubber. In some instances the dispersed particles contain about 75% to 80% chlorinated rubber with the remainder of the dispersed particles comprising components of the varnish or dispersant and absorbed or entrapped solvent. It appears that the chlorinated rubber in the dispersed particles selectively absorbs components of the varnish, such as esters of rosin-maleic anhydride adduct. Also, the chlorinated rubber absorbs rosin esters and fatty acid esters from the varnish. The presence of the absorbed components from the varnish appears to aid in maintaining the particles in a finely divided form and to prevent agglomeration of the particles.

Films cast from the dispersions of this invention have been found to be clear, quick drying, glossy, and are typical of similar combinations of chlorinated rubber and semialkyd resins cast from solutions. The value of the chlorinated rubber dispersions is realized only if a film prepared from the dispersion is clear and typically glossy. Clear homogeneous films are effected only after the K-B of the residual solvent has reached a level at which the chlorinated rubber is soluble. It is important, therefore, to select aromatic and aliphatic solvents with care to insure proper flow characteristics during the drying process. This becomes particularly important when the dispersion is thinned to less than 40% solids or nonvolatiles. If improperly thinned, the dispersions of less than 30-35% solids will produce seedy films which are an indication of nonhomogeneity of the chlorinated rubber in the varnish. Such films exhibit poor resistance to acids and alkalies. As indicated above, proper thinners are combinations of low boiling aliphatic and high boiling aromatic solvents.

In preparing the solution or blend of varnish and chlorinated rubber, it is desirable to add the varnish to the chlorinated rubber solution. The reverse procedure, i. e., the addition of chlorinated rubber solution to varnish, sometimes results in precipitation of the chlorinated rubber. However, this reverse procedure can be used when adequate stirring of the mixture can be provided. When facilities such as a ball mill or pebble mill with good agitation are available, either method of addition can be used.

It has been noted that the average size of the particles in the dispersions prepared according to this invention is less than one micron and usually not greater than 0.5 micron. This small particle size is essential to the preparation of good dispersions since at particle sizes of 3 microns and higher, the dispersions are relatively poor and unstable.

In addition to the ingredients or components discussed above, the dispersions of this invention can contain the normal types and quantities of drying agents used in the above varnishes, such as resinates, naphthenates, linoleates, and the like. Similarly, the normal stabilizers, such as epichlorohydrin, bisphenol-epichlorohydrin resins, polyglycidol resins, and the like, can be incorporated. Additionally, any of the usual pigments that are employed with chlorinated rubber can be used with these dispersions.

Among the advantages gained from the use of the dispersion technique to introduce chlorinated rubber into a varnish or alkyd are as follows:

(a) Low cost solvent blends are used.
(b) Obnoxious odor of solvents is reduced.
(c) No lifting occurs on second coat application.
(d) Infinite dilution with aliphatic hydrocarbons is possible.
(e) Paint brushes and other equipment can be cleaned with standard paint thinners.
(f) Good sprayability can be obtained at a relatively high viscosity without cobwebbing.
(g) In general higher solids content can be obtained at a lower viscosity than can be obtained with similar formulations in which the chlorinated rubber is present in a solution.

Various modifications and additional advantages of this invention will be apparent from the above disclosure.

What I claim and desire to protect by Letters Patent is:

1. The method of forming a protective coating composition wherein finely divided precipitated particles comprising chlorinated rubber are suspended in a nonsolvent mixture of aromatic and aliphatic hydrocarbons which comprises dissolving chlorinated rubber in a normally liquid aromatic hydrocarbon solvent for said chlorinated rubber; adding to the resulting chlorinated rubber solution a varnish containing a maleic anhydride-modified pentaerythritol ester of rosin and having a viscosity greater than 0.65 stoke and less than 3.7 stokes as measured in a 50% solids solution with a solvent having a Kauri-Butanol value of 37-38 to form a clear blend; and then diluting the resulting clear blend with a normally liquid aliphatic hydrocarbon having a boiling point not above the boiling point of said aromatic hydrocarbon until finely divided particles containing chlorinated rubber are precipitated to form a suspension of said particles in a nonsolvent mixture of aromatic and aliphatic hydrocarbons, the aromatic hydrocarbon content of said nonsolvent mixture being from 15% to 45% by weight, the resulting composition containing from 5% to 40% total solids, said chlorinated rubber being from 1% to 50% of said total solids.

2. The method of forming a protective coating composition wherein finely divided precipitated particles comprising chlorinated rubber are suspended in a nonsolvent mixture of aromatic and aliphatic hydrocarbons which comprises dissolving chlorinated rubber having a 10-centipoise viscosity in a normally liquid aromatic hydrocarbon solvent for said chlorinated rubber; adding to the resulting chlorinated rubber solution a varnish containing a maleic anhydride-modified pentaerythritol ester of rosin and having a viscosity of 2 to 3.2 stokes as measured in a 50% solids solution with a solvent having a Kauri-Butanol value of 37-38 to form a clear blend; and then diluting the resulting clear blend with a normally liquid aliphatic hydrocarbon having a boiling point below the boiling point of said aromatic hydrocarbon until finely divided particles containing chlorinated rubber are precipitated to form a suspension of said particles in a nonsolvent mixture of aromatic and aliphatic hydrocarbons, the aromatic hydrocarbon content of said nonsolvent mixture being from 15% to 45% by weight, the resulting composition containing from 25% to 40% total solids, said chlorinated rubber being from 1% to 50% of said total solids.

3. A protective coating composition consisting essentially of (1) finely divided precipitated particles containing chlorinated rubber suspended in a mixture of normally liquid aromatic and aliphatic hydrocarbons, said particles having an average particle size of less than one micron, and said hydrocarbon mixture being a nonsolvent for said chlorinated rubber, and (2) a varnish containing a maleic anhydride-modified pentaerythritol ester of rosin and having a viscosity greater than 0.65 stoke and less than 3.7 stokes as measured in a 50% solids solution with a solvent having a Kauri-Butanol value of 37-38, the aromatic hydrocarbon content of said hydrocarbon mixture being from 15% to 45% by weight, said aliphatic hydrocarbon having a boiling point not above the boiling point of said aromatic hydrocarbon, said composition having a total solids content of 5% to 40% by weight and said chlorinated rubber being from 1% to 50% of said total solids content.

4. A protective coating composition in accordance with claim 3 in which said varnish has a viscosity of 2 to 3.2 stokes, and said composition has a total solids content of 25% to 40% by weight.

References Cited in the file of this patent
UNITED STATES PATENTS

| 2,057,442 | Mik | Oct. 13, 1936 |
| 2,085,778 | Winklemann | July 6, 1937 |
| 2,415,775 | Waldie | Feb. 11, 1947 |
| 2,727,934 | Brown | Dec. 20, 1955 |